United States Patent Office 3,379,589
Patented Apr. 23, 1968

3,379,589
SOLUBILIZING HIGH ENERGY PROPELLANT POLYMERS
Edward A. Hunter, Westfield, and John Brooke Gardiner, Mountainside, N.J., assignors to Esso Research and Engineering Company, a corporation of Delaware
No Drawing. Filed Dec. 12, 1960, Ser. No. 75,444
9 Claims. (Cl. 149—109)

This invention is concerned with safe solubilizing of $NF_2$-containing polymers which have created hazards in handling, e.g. in removal from processing apparatus, storage receptacles, or rocket casings.

In accordance with the present invention the high-energy polymers capable of violent reaction on account of their $CNF_2$-group contents are safely decomposed and solubilized at ordinary temperatures by a low molecular weight or liquid primary polyamine, which contains at least two primary amino groups ($-NH_2$), as in ethylenediamine ($H_2NCH_2CH_2NH_2$).

In the manufacture of oxidizing binders $NF_2$ groups for propellants, for example, by the reaction of $N_2F_4$ with polybutadiene, difficulty is sometimes experienced with crosslinking and gelling of the polymer to yield a highly insoluble mass in the reactor. This presents a dual problem in that no good solvent has been known to clean the reactor for service, and furthermore a serious hazard exists in mechanical methods previously employed to remove this highly energetic solid. Acids, bases, and a variety of solvents have been tested as means of removing this polymeric gel and have been found to be ineffectual.

The reaction of $N_2F_4$ with polybutadiene or other unsaturated polymers is carried out at moderate temperature, e.g., 20° to 100° C. and pressures of about 5 to 450 p.s.i.a. in ½ to 18 hours to add $NF_2$ groups to double bonds so that the resulting multi-$CNF_2$ polymer contains from about 40 to 80 wt. percent of $NF_2$ groups. Various polymers containing the high-energy $NF_2$ groups may be made from monomers which are $NF_2$ adducts, such monomers having suitable olefinic structures or containing hetero functions for polymerization or condensation. These multi-$CNF_2$ polymers are useful as binders in rocket propellant composites containing fuel ingredients, e.g., boron or aluminum powder and various liquid or solid oxidizers. The use of the diamine solvents pertains to all of such $CNF_2$ polymers, in semi-solid form, plasticized form, plastisol, gel or solid form.

The present invention is based on the discovery that a liquid polyamine, e.g. ethylene diamine, possesses sufficiently strong solvent power for the $NF_2$-containing polymers to effect solution and deactivate the polymers without violent reaction. This desired solubilizing action is obtained on hardened highly cross-linked polymers containing $CNF_2$ groups as well as freshly formed gels of such polymers.

Although ethylene diamine acts as the preferred solvent, its homologs, such as, trimethylenediamine, 1,2-propane diamine, hydrazine, diethylenetriamine, triethylenetriamine, and other such polyamines having up to 10 carbon atoms and 2 to 4 primary amino groups per molecule are considered useful for the purpose.

In using ethylenediamine or liquid containing such a polyamine as reacting solvent ingredient, the amount of solvent, rate of its addition, its composition and conditions of its use are controlled to prevent violent reaction. In general, the conditions are usually atmospheric conditions of temperature and pressure but these may be varied and depend on the amount and kind of $NF_2$-containing materials to be treated. Generally, the temperature of treatment would be in the range of 10° C. to 50° C., preferably 20° to 25° C.

Methods of using a polyamine and demonstrating its effectiveness are shown in the following examples:

Example 1

A freshly prepared sample of insoluble gel of $N_2F_4$-polybutadiene adduct was removed from the reactor mechanically. On contacting 1 part of the polymer with about 5–10 parts ethylenediamine at 25° C., the polymer went essentially completely into solution within 2 hours. The solution produced is completely miscible with water.

Example 2

Samples of the same polymer and system as Example 1 showed little or no solution with the following solvents:

(1) Acetonitrile
(2) Hexane
(3) $H_2SO_4$, conc.
(4) $H_2SO_4$+hexane
(5) Chromic acid
(6) 10% KOH in methanol
(7) $NH_4OH$, conc.
(8) $HNO_3$, conc.
(9) Dioxane
(10) Aniline
(11) Formamide
(12) Trimethylamine
(13) Amino acetic acid

Example 3

A dry, powdered, highly cross-linked sample of polybutadiene-$N_2F_4$ adduct from storage was tested with ethylenediamine as in Example 1. Essentially complete solution took place within 16 hours.

Example 4

A sample of polybutadiene $N_2F_4$ adduct which had been extensively degraded by aging at 90° C. was tested and found to be insoluble in a number of solvents. On contacting 1 part of polymer with about 20 parts of ethylenediamine at 25° C., essentially complete solution resulted within 30 minutes. The solution is miscible with water.

Example 5

The same polymer and system as in Example 1 was tested with 98% hydrazine. The mixture detonated indicating that hydrazine undiluted is unsafe for this application. Dilution of the hydrazine by organic solvents that are less reactive retards the excessive reaction by $H_2NNH_2$.

Example 6

A test was made as in Example 5 using about a 50 vol. percent of hydrazine in acetonitrile. This mixture attacked the polymer vigorously and effected appreciable solution. However, this mixture is neither as safe nor as effective as ethylenediamine.

Example 7

Ratios of 20–100% ethylenediamine with acetonitrile have been used to dissolve a great variety of polymeric gels and dispose of a variety of hazardous $NF_2$ compounds safely.

The diamine or polyamine solvent can be used in suitable proportion with more vigorously reactive solvent ingredients, such as hydrazine, or after using the diamine for solubilizing and deactivating, a more vigorously reactive solvent such as hydrazine may be used, as in the removal of excessively refractory polymer gels.

If the polyamine acts too rapidly on a polymer or organic composition having a high $NF_2$ content, a higher homolog of the polyamine may be used by itself or mixed with the rapid action polyamine, e.g. as with ethylenediamine or hydrazine.

Less active or inert diluents may be used to moderate the decomposition and solubilizing action of the polyamines. Polar solvents or diluents, e.g. acetonitrile, may be used to advantage with the polyamines for wetting and penetrating the $CNF_2$ polymeric materials.

The treatment with liquid polyamine or mixed polyamines may be used for disposing of impact sensitive and hazardous residues containing $NF_2$. It can be used for removal of such hazardous materials (tars and polymers) from all types of apparatus and containers, including rocket casings which are intended to be cleaned free of $NF_2$ containing substances. Water may be then used to rinse out the apparatus, containers, or rockets.

What is claimed is:

1. Method of solubilizing, decomposing, and making water-soluble organic polymeric gel material containing $NF_2$ groups, which comprises contacting, decomposing, and solubilizing said organic material with liquid polyamine containing 2 to 8 carbon atoms and at least 2 primary amino groups.

2. Method of solubilizing and decomposing organic polymeric gel material containing $NF_2$ groups which comprises decomposing and dissolving said material in liquid solvent containing ethylenediamine as a reactive solvent component.

3. Method of removing impact-sensitive cross-linked polybutadiene polymers containing $NF_2$ groups from a container which comprises solubilizing the polymers in and reacting the polymers with ethylenediamine at a controlled rate and at a temperature in the range of about 10° to 50° C., and removing a resulting solution of the reacted polymers from said container.

4. The method of claim 3 in which the polymers are the polybutadiene-$N_2F_4$ adduct in gel form.

5. Process of removing an organic residue of $CNF_2$ polymers in gel form from a container which comprises contacting and reacting the residue with sufficient ethylenediamine under controlled conditions to deactivate the organic residue at a safe rate and solubilize a substantial part of the residue and removing the resulting solution of the reacted polymers from the container.

6. In the process of claim 5 contacting refractory residue treated after deactivation by the ethylenediamine with hydrazine to obtain further decomposition of the refractory residue and removing the resulting decomposed residue from the container.

7. Process of removing solid polymeric organic material containing $CNF_2$ groups from a receptacle holding said material, which comprises contacting said material in the receptacle with a liquid mixture of a polyamine containing 2 to 10 carbon atoms and 2 to 4 primary amino groups that decomposes the $CNF_2$ groups and of a polar solvent which aids solubilizing and removing a resulting solution of the decomposed solid organic material.

8. Process of decomposing and solubilizing polymeric gel material containing $CNF_2$ group which comprises contacting and reacting the gel material with a low molecular weight polyamine that contains 2 to 10 carbon atoms and 2 —$NH_2$ groups per molecule and is diluted with a reaction moderating organic liquid.

9. Method of decomposing and solubilizng a polybutadiene-$N_2F_4$ adduct which comprises, reacting said adduct with ethylenediamine at about 20° to 25° C. to obtain a solution of the decomposed adduct which is miscible with water, and rinsing said solution from a container with water.

No references cited.

BENJAMIN R. PADGETT, *Primary Examiner.*

CARL D. QUARFORTH, LEON D. ROSDOL,
*Examiners.*

R. D. MORRIS, *Assistant Examiner.*